J. W. HASSELKUS.
PERISCOPE AND THE LIKE.
APPLICATION FILED OCT. 28, 1911.
1,047,051.
Patented Dec. 10, 1912.
2 SHEETS—SHEET 1.
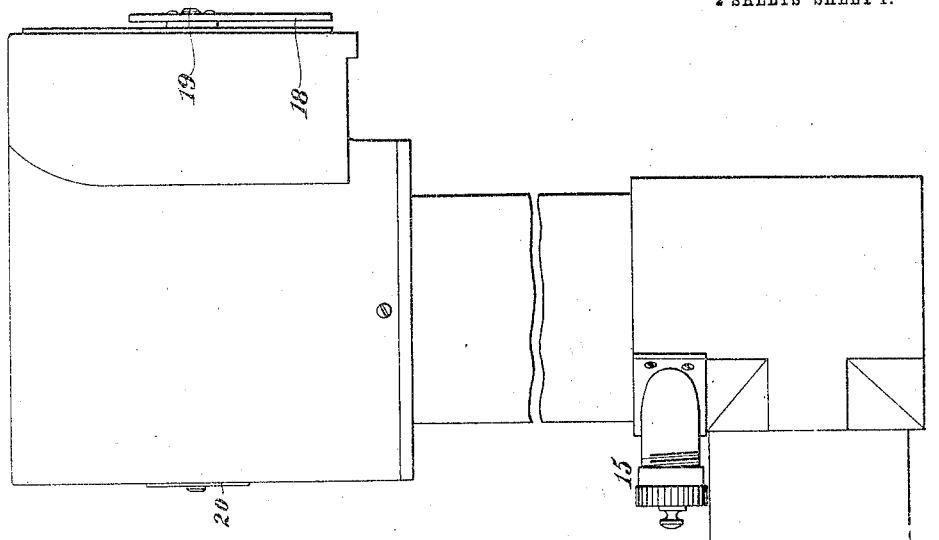
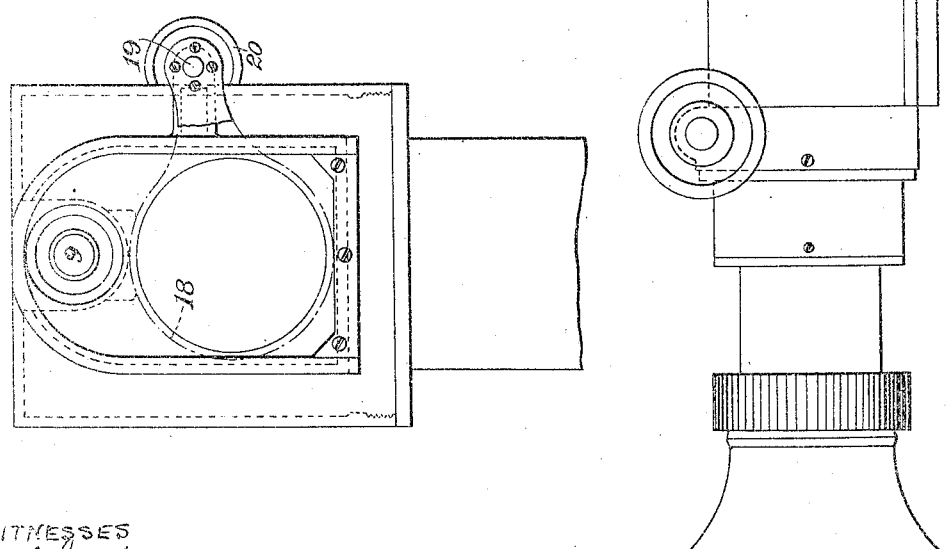
WITNESSES
INVENTOR
John William Hasselkus
BY
Howson and Howson
his ATTORNEYS

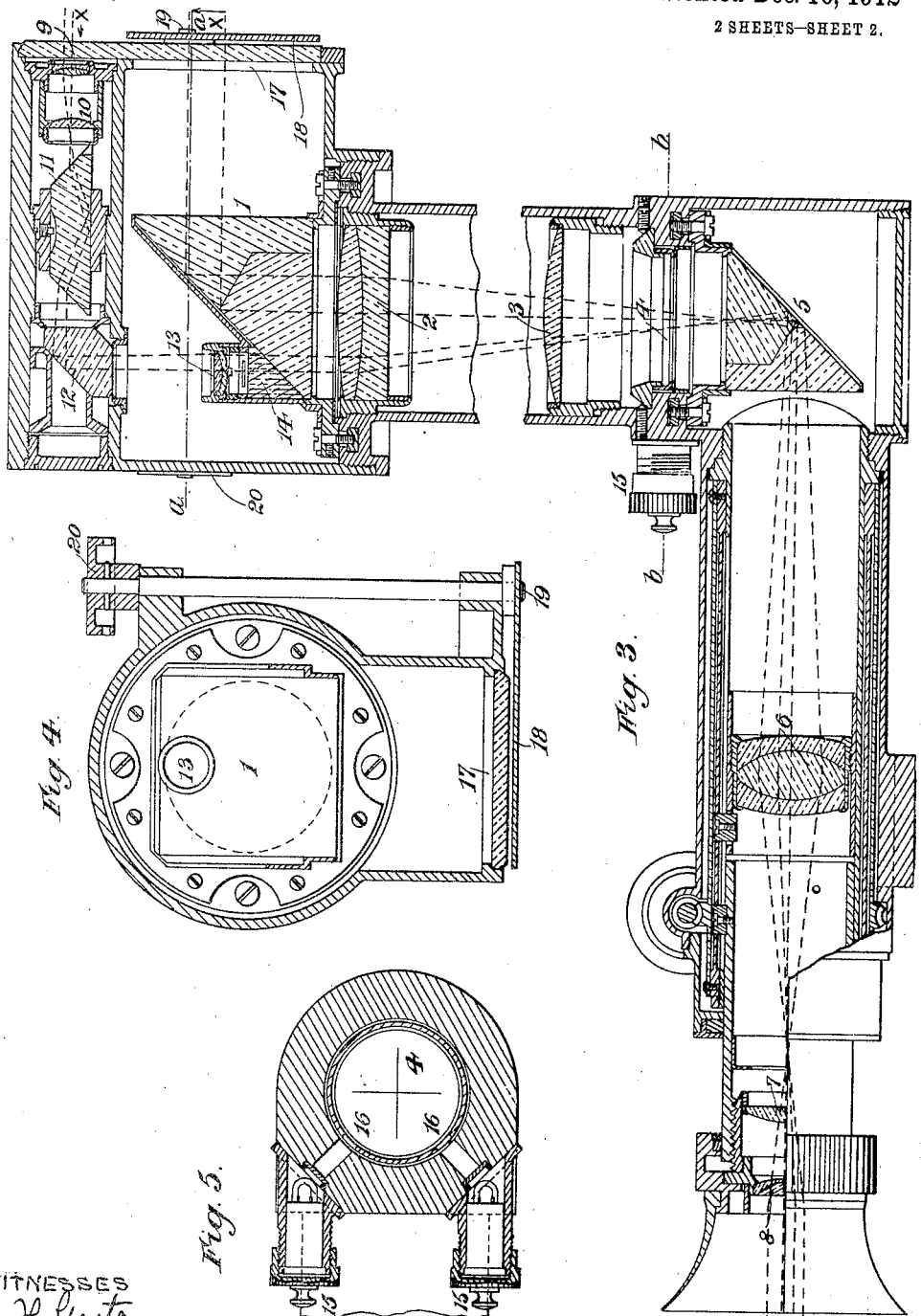

UNITED STATES PATENT OFFICE.

JOHN WILLIAM HASSELKUS, OF CLAPHAM COMMON, LONDON, ENGLAND, ASSIGNOR TO ROSS LIMITED, OF CLAPHAM COMMON, LONDON, ENGLAND.

PERISCOPE AND THE LIKE.

1,047,051.   Specification of Letters Patent.   Patented Dec. 10, 1912.

Application filed October 28, 1911. Serial No. 657,321.

*To all whom it may concern:*

Be it known that I, JOHN WILLIAM HASSELKUS, a subject of the King of Great Britain and Ireland, of 3 North Side, Clapham Common, in the county of London, England, have invented new and useful Improvements in Periscopes and the Like, of which the following is a specification.

This invention relates to periscopes and the like adapted to be used to obtain, as required, either a view equivalent to that seen by the naked eye, or an enlarged view as seen through a telescope of suitable power, and this invention relates more especially to instruments which are to be used for the sighting of objects from protected positions, such as, for instance, from ships' turrets, or the like, for look-out purposes, or for sighting accurately for gun-fire.

The principal object of this invention is to provide an instrument in which the two optical systems which provide for the aforesaid views are so combined that they form a completely self-contained instrument, without auxiliary lenses, or prisms, having to be moved into, and out of, the path of the rays for the purpose of obtaining one, or the other, view as required, thus avoiding all danger of disarrangement of the instrument from this cause. The light can be shut off from either optical system as required by means of disks, shutters, or blinds, which can be carried quite distinctly from the instrument itself, although (as such disks, shutters, or blinds, can be very light) they can be carried by the instrument if desired.

The optical portion of the instrument to give the enlarged view may consist of a telescope of fixed power, or of the type known as the variable power telescope, with a sighting cross. The telescope is arranged in such manner as to form a periscope by means of upper and lower prisms. The lenses may be such as are usually employed in telescopes of this description.

The auxiliary optical portion which provides for the view corresponding to that seen by the naked eye comprises a combination of lenses, which collect the rays from the object, and an ordinary right angular erecting prism which deflects the rays at an angle of 90°, or thereabout, besides causing a sidewise reversal of the image. To reverse the image again, but in the vertical direction, the bundle of rays which leaves the erecting prism is caused to pass through the upper of the aforesaid prisms, utilizing a polished surface thereof as a totally reflecting surface which causes the second reversal of the rays. After the rays leave the said upper prism, they pass through a prism which changes the direction of the rays so as to make them parallel, or nearly so, to the course they followed before entering the said upper prism. To complete the auxiliary optical portion, an achromatic lens is interposed in the path of the rays to make them parallel to each other before they impinge upon the object glass of the main telescope, and then the rays take a course through the complete telescopic system in a similar manner to all the rays entering the aforesaid upper prism. The said achromatic lens may be to the rear of the aforesaid prism, which receives the rays from the upper prism, or in any convenient place along the path of the rays, for example it may be placed directly after the lens combination, or after the Amici prism, or between the upper prism and the prism beneath it.

The auxiliary optical system may be presumed to have a negative power equal to the power of the main telescope or nearly so.

If desired, instead of the aforesaid upper prism being utilized for the reversal of the image in the vertical direction, a special prism may be used for the purpose and instead of the rays passing through the aforesaid small prism to bring them parallel, or nearly so, to the course they took before entering the said special prism, they may pass through a prism cemented to the hypotenuse of the upper prism, or, if desired, the erecting prism may be replaced by an ordinary right angle reflecting prism similar to the upper prism, and the special reversing prism be dispensed with. The necessary reversal of image may then be effected by erecting lenses, or prisms, for instance, an arrangement of lenses, such as are used in the main telescope, or other types of erecting telescopes. The rays from this auxiliary arrangement will pass through the prism cemented to the hypotenuse of the upper prism as aforesaid.

The accompanying drawings illustrate an instrument constructed according to this invention, but I do not limit myself to the precise construction illustrated.

Figure 1 is an elevation of the instrument. Fig. 2 is an elevation of the upper part of Fig. 1 at right angles thereto, Fig. 3 is a longitudinal section, and Figs. 4 and 5 are sections respectively along the lines a a and b b Fig. 3.

The optical portion of the instrument to give the enlarged view consists of a telescope of the type known as the variable power telescope, 2 being the object glass, 3 the collecting lens, 4 the transparent glass plate with a sighting cross etched thereon, 6 the erecting lens and 7 and 8 the lenses of an eye-piece of the Ramsden type. By altering the distances between the sighting cross 4 and the erecting lens 6 and the eye piece, the power is varied in the usual manner. It is unnecessary to particularly describe this portion of the instrument as its construction and operation may be of the usual, or any suitable, kind. By the introduction of the right angled prisms 1 and 5, the telescope is made to constitute a periscope with any predetermined displacement of the sighting line.

If desired, instead of the variable power telescope, an ordinary erecting telescope of a suitable fixed power can be used in conjunction with the prisms constituting the periscope, and in the place of the transparent glass plate 4 with etched sighting lines, other cross lines, such as lines made of wire, or spider's web, for example, may be used and a device, or devices, such as are indicated at 15, may be used for illuminating through a passage, or passages, 16 the lines at night. The auxiliary optical portion which provides for the view corresponding to that seen by the naked eye comprises a combination of lenses 9 and 10 by which the rays are collected from the object, an erecting prism 11 which causes the image to be reversed in vertical plane, a prism 12 for the purpose of deflecting the rays at an angle of 90°, or thereabout, and of reversing the image in the horizontal plane, and an achromatic lens 13 which causes the rays to emerge as parallel rays before they strike the small prism 14 cemented upon the hypotenuse of the prism 1, so as to enable the said rays to pass uninterrupted to the object glass 2 which they traverse and emerge at the eye-piece to form an image corresponding to that seen by the naked eye. To obtain this view it is desirable to close the aperture 17 leading to the prism 1, which can be done by means of the shutter 18 which is shown as being hinged at 19 so that it can be also utilized to close the aperture to the lens combination 9 and 10 when it is desired to use the instrument as a telescope. The said shutter can be operated by any suitable means, such, for instance, as a cord passed over the wheel 20.

The auxiliary optical system comprising the lenses 9 and 10, prisms 11, 12, and achromatic lens 13, should, of course, possess a negative power equal, or nearly equal, to the power of the main telescope.

If desired, the arrangement of the auxiliary optical system may be modified, for instance, the reversals of the image in both places may be effected through an arrangement of lenses, or prisms, for instance, an arrangement of lenses, similar to that employed in the main telescope, in which case the erecting prism will be dispensed with and the Amici prism be replaced by a right angle prism similar to the prism 1 used with the main telescope, or the prism 1 of the main telescope may be utilized as an erecting prism; in this case the Amici prism is retained and a small right angle prism is placed beneath the prism 1 to bring the rays into a course parallel, or nearly parallel, with the axis of the main telescope.

Having now particularly described and ascertained the nature of my said invention and in what manner the same is to be performed, I declare that what I claim is:—

1. An instrument of the type described, comprising two optical systems, the elements of which are arranged in constant predetermined relation, one of said systems giving a materially magnified periscopic image and the other giving a periscopic image substantially corresponding to that of the naked eye, said systems having a common sighting field whereby without alteration of the position of the elements of said optical systems, an object may be viewed in said common field through the one system upon the exclusion of light from the other system, and vice versa, substantially as described.

2. An instrument of the type described, comprising independent light-receiving apertures, a common field of view, and two periscopic optical systems, one giving an image substantially as seen by the naked eye, and the other giving an image materially magnified, the elements of said systems being constantly so related as to bring their respective images into axial coincidence in said common field of view, whereby, without alteration of the position of the elements of said systems, an object may be viewed in said common field through the one system upon the exclusion of light from the other system and vice versa, substantially as described.

3. An instrument of the type described, comprising independent light receiving apertures, a common locating sight, periscopic optical systems respectively communicating with said apertures and converging the images received therefrom upon said locating sight through different paths of light travel, one of said systems giving an image substantially as seen by the naked eye, and the other giving an image materially magnified, and an eye piece common to both optical systems through which the images converging on said common locating sight may be viewed.

4. An instrument of the type described, comprising a main optical system to give an enlarged image, an auxiliary system to give an image substantially as seen by the naked eye, a common locating sight for said systems, and means for converging the light admitted to said systems upon the common locating sight, said systems communicating with independent sighting apertures, substantially as described.

5. An instrument of the type described, comprising a main optical system to give an enlarged image, an auxiliary system to give an image substantially as seen by the naked eye, a common locating sight for said systems, and means for converging the light admitted to said systems upon the common locating sight, said systems communicating with independent sighting apertures, together with means for controlling the admission of light to the two optical systems, substantially as described.

In testimony whereof I have signed my name to this specification in the presence of two subscribing witnesses.

JOHN WILLIAM HASSELKUS.

Witnesses:
CHARLES W. CROCKER,
HERBERT D. JAMESON.